Nov. 3, 1964 R. J. COHEN 3,154,952
GYROSCOPE FLEXLEAD CONNECTIONS
Filed Sept. 10, 1962 2 Sheets-Sheet 1
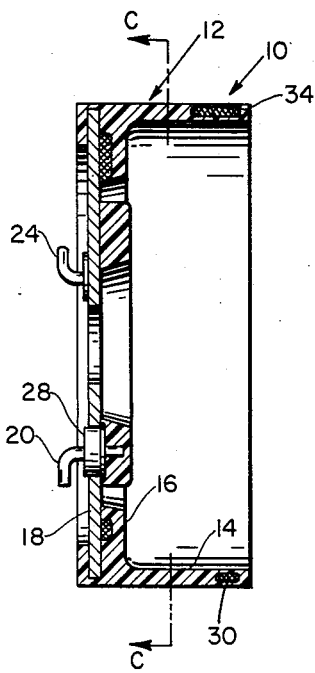
FIG. 2
(SECT A-A)
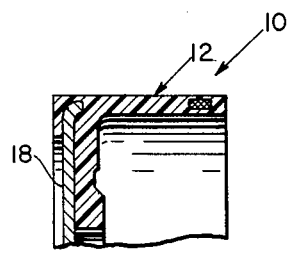
FIG. 5
(SECT E-E)
FIG. 3
(SECT B-B)
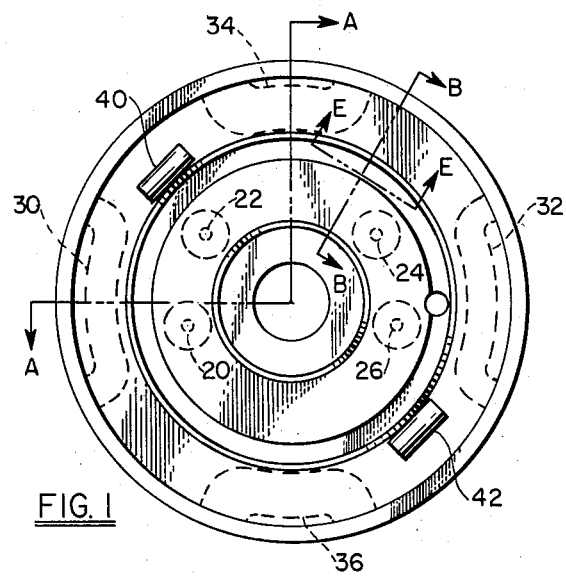
FIG. 1
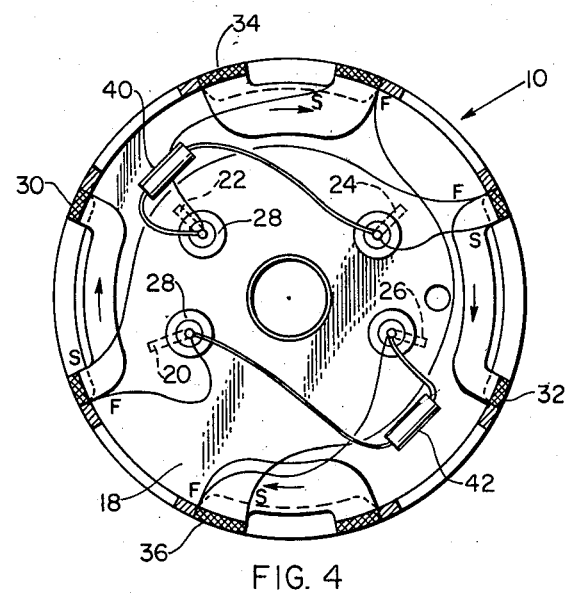
FIG. 4
(SECT C-C)
ROBERT J. COHEN
INVENTOR.
BY S. A. Giarratana
George B. Oujevolk
attorneys

United States Patent Office 3,154,952
Patented Nov. 3, 1964

3,154,952
GYROSCOPE FLEXLEAD CONNECTIONS
Robert J. Cohen, Wyckoff, N.J., assignor to General Precision Inc., Little Falls, N.J., a corporation of Delaware
Filed Sept. 10, 1962, Ser. No. 222,567
4 Claims. (Cl. 74—5)

The present invention relates to the connection of flexleads to gyroscopes for energizing the pickoff and torquer coils, and more particularly to an arrangement wherein the torquer coils and pickoff coils of a rotor for a gyroscope are energized through the same pair of flexleads.

Prior to the present invention, a typical gyroscope rotor having a pair of pickoff coils and a pair of torquer coils needed four flexleads to make the electrical connections to the coils. The torquer coils were connected in series with a first pair of terminal posts and the pickoff coils were similarly connected together in series with a second pair of terminal posts, and a separate pair of flexleads was required for each pair of terminal posts. In addition to the four flexleads, four cable wires were required per gyro and four connector pins in each cable plug. Therefore the gyro reliability and performance was reduced by the flexleads because of the fixed restraint of movement about the gyro output axis and consequent fixed restraint in stability. Further, the second set of flexleads required six extra cable leads and six extra slip rings per gimbal for the platform on which the gyroscope was mounted.

In accordance with the present invention, the need for the second set of flexleads is eliminated by coupling the pickoff coils to the torquer coils by capacitors so that both the pickoff coils and torquer coils are connected to a single pair of flexleads. In closed loop operation, the pickoff output signal at a particular carrier frequency is applied through the coupling capacitors to the output flexleads of the gyro and the direct current feedback is applied to the torquer coils through the same flexleads. The coupling capacitors serve to isolate the torquer current from the pickoff circuit by removing the direct current from the pickoff coils. By eliminating the need for a second set of flexleads per gyro, gyro reliability and performance is improved as mentioned previously and in platforms having three or four gimbals a saving of 18 to 24 slip rings plus associated cable leads and connector rings per platform can be realized.

Accordingly, it is one object of the invention to improve the reliability, stability and performance of a gyroscope.

It is another object of the invention to reduce complexity and improve the reliability of a stable element (plaftorm) into which the gyroscope is installed.

It is a further object of the invention to incorporate coupling capacitors into the pickoff coil and D.C. torquer coil support of a gyroscope to enable the torquer D.C. current and the pickoff output signal at a carrier frequency to be combined and thus reduce the number of flexleads required.

Other objects and features of novelty of the present invention will be specifically pointed out or will otherwise become apparent when referring, for a better understanding of the invention, to the following description taken in conjunction with the accompanying drawings, wherein:

FIG. 1 is a plan view of a pickoff and torquer assembly for the rotor of a gyroscope embodying features of the invention;

FIG. 2 is a sectional view taken along the line A—A of FIG. 1;

FIG. 3 is a fragmentary sectional view taken along the line B—B of FIG. 1;

FIG. 4 is a sectional view taken along the line C—C of FIG. 2 with the casting material removed;

FIG. 5 is a sectional view taken along the line E—E of FIG. 1;

Figure 6:
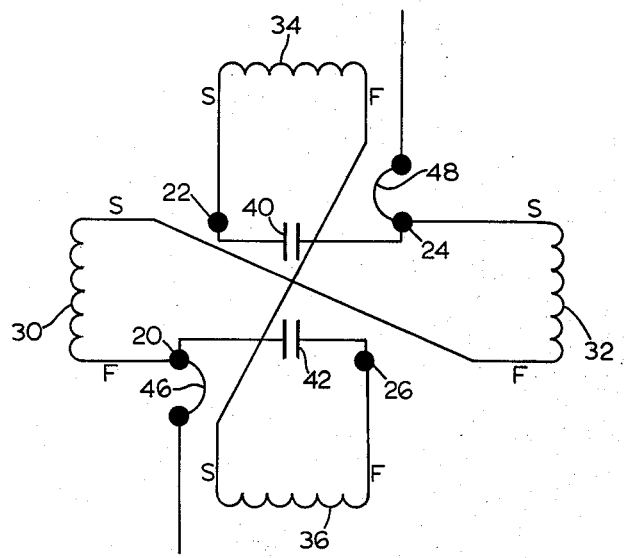
FIG. 6 is a schematic diagram of the electrical circuit connecting the pickoff and torquer coils.

Referring to FIGS. 1–5, a typical pickoff and torquer assembly 10 for the rotor of a gyroscope is illustrated which comprises a thin-walled cast housing 12 of a suitable insulating material having a cylindrical wall 14 and a washer-shaped bottom wall 16. A washer-shaped metal plate 18 is fixed on the outside of the washer-shaped bottom wall 16 and has four terminal posts 20–26 fixed therein by insulated bushings 28 to insulate the terminals from the plate 18. A torquer coil 30 is embedded partially in the bottom wall 16 and partially in the side wall 14 of the housing and a second torquer coil 32 is similarly embedded in the housing in diametrically opposed relation to the torquer coil 30. A pair of pickoff coils 34 and 36 are similarly embedded in the housing in position to cooperate with the torquer coils 30 and 32 to define a pair of orthogonal axes.

As most clearly illustrated in FIG. 6, the torquer coils 30 and 32 are connected together in series between the terminal posts 20 and 24 and the pickoff coils 34 and 36 are connected together in series between the terminal posts 22 and 26. The circuit as described thus far is that used prior to the present invention, and with this circuit the pickoff output signal at some carrier frequency was taken from the terminal posts 22 and 26 and the direct current feedback was applied to the terminal posts 20 and 24 for energizing the torquer coils 30 and 32. Therefore four separate flexleads were required by this construction, one for making connection to each of the terminal posts 20–26 to enable the assembly 10 to rotate through a limited angle with the gyroscope rotor.

In accordance with the present invention, the need for two of the four flexleads is eliminated by connecting a first capacitor 40 between the terminal posts 22 and 24 and a second capacitor 42 between the terminal posts 20 and 26. With this arrangement, and in a closed loop operation, the pickoff output signal at a carrier frequency (typically 400 c.p.s., 3860 c.p.s., 6400 c.p.s., or 20,000 c.p.s.) is applied through the coupling capacitors to the terminal posts 20 and 24, and the direct current feedback for energizing the torquer coils 30 and 32 is applied to the same terminal posts 20 and 24. The coupling capacitors serve to isolate the torquer current from the pickoff circuit by removing the direct current from the pickoff coils. If the capacitor isolation were not employed, the D.C. excitation of the pickoff coils might degrade gyro torquer linearity since the pickoff coils are situated in the stray field of the torquer permanent magnet circuit.

With this arrangement, only two flexleads 46 and 48 need be connected to the terminal posts 20 and 24, thereby improving gyro reliability and performance by way of lower fixed restraint about the gyro output axis. In addition, the gyro application in a stable element (platform) is enhanced because the number of slip rings per gimbal and associated cable leads and connector rings per platform is greatly reduced.

Figure 7:
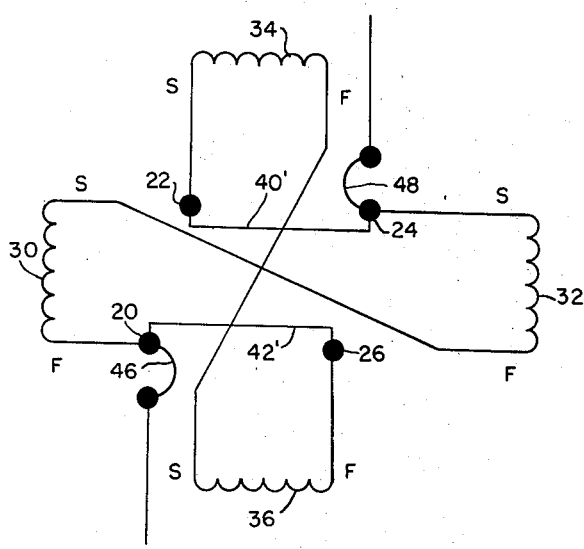
FIG. 7 is a schematic diagram of a modified form of the electrical circuit shown in FIG. 6.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims. For example, in those applications not requiring maximum torque linearity, direct connections 40′ and 42′ may be substituted for the coupling capacitors 40 and 42, as shown in the FIG. 7 embodiment which is otherwise identical to that of FIG. 6. With this arrangement, the direct current feedback is also applied to the pickoff coils which may degrade gyro torquer linearity as previously mentioned, but not enough to be objectionable for an application having less strict accuracy requirements.

What is claimed is:

1. A pickoff and torquer assembly for a gyroscope rotor comprising first and second terminals, a pair of torquer coils connected in series between said terminals, and a pair of pickoff coils connected together in series between said terminals and in parallel with said torquer coils whereby only two flexleads are required to connect the torquer and pickoff coils to an external circuit.

2. A pickoff and torquer assembly for a gyroscope rotor comprising first and second terminals, a pair of torquer coils connected together in series between said terminals, a pair of pickoff coils connected together in series, a first capacitor coupling one of said pickoff coils to said first terminal, and a second capacitor for coupling the other of said pickoff coils to said second terminal whereby only two flexleads are required to connect the torquer coils and pickoff coils to an external circuit.

3. A pickoff and torquer assembly for a gyroscope rotor comprising a pair of terminals, torquer coil means connected across said termianls, and pickoff coil means connected between a pair of capacitors, one of said capacitors being connected to one of said terminals and the other of said capacitors being connected to the other of said terminals whereby only two flexleads are required for connecting both said torquer coil means and pickoff coil means to an external circuit.

4. A pickoff and torquer assembly for a gyroscope rotor comprising a cylindrical body having a pair of pickoff coils thereon in position to define a first orthogonal axis and a pair of torquer coils thereon in position to define a second orthogonal axis, first and second terminals mounted on said body, circuit means for connecting said torquer coils in series with one another between said first and second terminals, a first coupling capacitor connected to said first terminal, a second coupling capacitor connected to said second terminal, and circuit means for connecting said pickoff coils in series with one another between said coupling capacitors whereby only two flexleads are required for connecting both said torquer coils and pickoff coils to an external circuit.

References Cited by the Examiner
UNITED STATES PATENTS 2,859,626  11/58  Maze _____ 74—5.7
3,025,708  3/62   Slater et al. _____ 74—5.46

BROUGHTON G. DURHAM, *Primary Examiner.*